United States Patent
Chae et al.

(10) Patent No.: US 10,100,151 B2
(45) Date of Patent: Oct. 16, 2018

(54) COMPOSITION FOR PREPARING POLYIMIDE, POLYIMIDE, AND ARTICLE INCLUDING SAME

(71) Applicant: SAMSUNG ELECTRONICS CO., LTD., Suwon-si, Gyeonggi-do (KR)

(72) Inventors: Jungha Chae, Yongin-si (KR); Byung Hee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 614 days.

(21) Appl. No.: 14/550,716

(22) Filed: Nov. 21, 2014

(65) Prior Publication Data

US 2015/0147554 A1 May 28, 2015

(30) Foreign Application Priority Data

Nov. 25, 2013 (KR) .................. 10-2013-0144125
Nov. 20, 2014 (KR) .................. 10-2014-0162857

(51) Int. Cl.
*B32B 27/32* (2006.01)
*C08G 73/10* (2006.01)
(Continued)

(52) U.S. Cl.
CPC ..... *C08G 73/1067* (2013.01); *C08G 73/1039* (2013.01); *C08G 73/1042* (2013.01);
(Continued)

(58) Field of Classification Search
CPC ............ C08G 73/1039; C08G 73/1042; C08G 73/1067; C09D 179/08; G02F 1/133305; C08J 2379/08; C08J 5/18
(Continued)

(56) References Cited

U.S. PATENT DOCUMENTS 4,014,834 A    3/1977  Concannon
4,473,523 A *  9/1984  Sasaki ................ C08G 73/1067
                                                                    264/204

(Continued)

FOREIGN PATENT DOCUMENTS

CN   101289543 A   10/2008
CN   101654518 A    2/2010
(Continued)

OTHER PUBLICATIONS

Extended European Search Report dated Apr. 13, 2015, of the corresponding European Patent Application No. 14194566.7.
(Continued)

*Primary Examiner* — Travis M Figg
(74) *Attorney, Agent, or Firm* — Cantor Colburn LLP

(57) ABSTRACT

A composition for preparing a polyimide including a tetracarboxylic dianhydride mixture including a tetracarboxylic dianhydride represented by Chemical Formula 1A, Chemical Formula 1B, or a combination thereof, a tetracarboxylic dianhydride represented by Chemical Formula 2, and a diamine represented by Chemical Formula 3:

Chemical Formula 1A (Continued)

-continued

Chemical Formula 1B

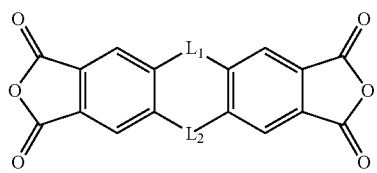

Chemical Formula 2

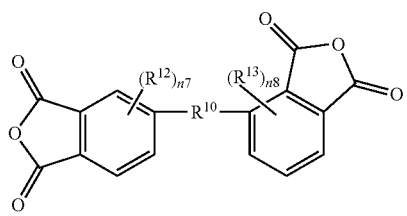

$NH_2-R^1-NH_2$     Chemical Formula 3 wherein in Chemical Formulae 1A, 1B, 2 and 3, definitions of groups and substituents are described in the specification.

13 Claims, 1 Drawing Sheet

(51) Int. Cl.
    *C08J 5/18*      (2006.01)
    *G02F 1/1333*      (2006.01)
    *C09D 179/08*      (2006.01)

(52) U.S. Cl.
    CPC .............. *C08J 5/18* (2013.01); *C09D 179/08* (2013.01); *G02F 1/133305* (2013.01); *C08J 2379/08* (2013.01)

(58) Field of Classification Search
    USPC ........................................................ 428/220
    See application file for complete search history.

(56) References Cited

U.S. PATENT DOCUMENTS

| | | | |
|---|---|---|---|
| 4,603,061 A | 7/1986 | St. Clair et al. | |
| 4,696,994 A | 9/1987 | Nakajima et al. | |
| 4,755,428 A * | 7/1988 | Noda | C08G 73/1064 428/402 |
| 4,908,409 A | 3/1990 | Oikawa et al. | |
| 4,937,317 A | 6/1990 | Pratt et al. | |
| 5,053,480 A | 10/1991 | Koto et al. | |
| 5,071,997 A | 12/1991 | Harris | |
| 5,665,802 A | 9/1997 | Maki et al. | |
| 5,898,048 A * | 4/1999 | Yamaguchi | C08J 5/00 264/319 |
| 6,319,597 B1 * | 11/2001 | Yamaguchi | B32B 15/08 428/215 |
| 6,699,572 B2 | 3/2004 | Yamamoto et al. | |
| 6,985,192 B1 | 1/2006 | Bouillet et al. | |
| 8,399,593 B2 | 3/2013 | Jung et al. | |
| 8,426,550 B2 | 4/2013 | Sohn et al. | |
| 8,586,689 B2 | 11/2013 | Jung et al. | |
| 8,592,528 B2 | 11/2013 | Cho et al. | |
| 8,969,909 B2 | 3/2015 | Simone et al. | |
| 2002/0090524 A1 * | 7/2002 | Yamamoto | B32B 15/08 428/458 |
| 2003/0212243 A1 | 11/2003 | Hergenrother et al. | |
| 2004/0110015 A1 * | 6/2004 | Narui | B32B 15/08 428/458 |
| 2006/0199895 A1 * | 9/2006 | Ozawa | C08K 3/04 524/496 |
| 2010/0228002 A1 | 9/2010 | Sohn et al. | |
| 2010/0305295 A1 * | 12/2010 | Nakayama | C08G 73/1007 528/189 |
| 2011/0218265 A1 * | 9/2011 | Kaneko | C08G 73/1007 521/184 |
| 2011/0311796 A1 * | 12/2011 | Jung | C08J 5/18 428/220 |
| 2012/0021234 A1 | 1/2012 | Fukukawa et al. | |
| 2012/0258354 A1 * | 10/2012 | Yamaguchi | H01G 9/08 429/176 |
| 2012/0296050 A1 | 11/2012 | Cho et al. | |
| 2013/0126940 A1 * | 5/2013 | Simone | C08G 73/1039 257/100 |
| 2013/0178597 A1 * | 7/2013 | Takasawa | C09D 179/08 528/346 |
| 2013/0203937 A1 | 8/2013 | Cho et al. | |
| 2013/0302586 A1 | 11/2013 | Sohn et al. | |
| 2013/0303691 A1 | 11/2013 | Cho et al. | |
| 2014/0023847 A1 | 1/2014 | Kochiyama et al. | |

FOREIGN PATENT DOCUMENTS

| | | |
|---|---|---|
| CN | 101985498 A | 3/2011 |
| CN | 102219902 A | 10/2011 |
| CN | 102382303 A | 3/2012 |
| CN | 102690415 A | 9/2012 |
| CN | 103081145 A | 5/2013 |
| CN | 103228704 A | 7/2013 |
| EP | 2597111 A1 | 5/2013 |
| JP | 8224843 A | 9/1996 |
| JP | 10-310639 A | 11/1998 |
| JP | 2002-096437 A | 4/2002 |
| JP | 2005-114836 A | 4/2005 |
| JP | 2005240028 A | 9/2005 |
| JP | 2009040850 A | 2/2009 |
| JP | 2009-227874 A | 10/2009 |
| JP | 2012040836 A | 3/2012 |
| KR | 1020090106217 A | 10/2009 |
| KR | 1020100100505 A | 9/2010 |
| KR | 1020110045779 A | 5/2011 |
| KR | 1020110047859 A | 5/2011 |
| KR | 1020110064749 A | 6/2011 |
| KR | 1020110090652 A | 8/2011 |
| KR | 1020110093177 A | 8/2011 |
| KR | 1020120069382 A | 6/2012 |
| KR | 1020120078346 A | 7/2012 |
| KR | 1020120083798 A | 7/2012 |
| KR | 1020130029129 A | 3/2013 |
| KR | 1020130091217 A | 8/2013 |
| KR | 1020130125639 A | 11/2013 |
| KR | 1020130125640 A | 11/2013 |
| WO | 2012024009 A1 | 2/2012 |
| WO | 2012-133594 A1 | 10/2012 |

OTHER PUBLICATIONS

Office Action dated Sep. 13, 2017, issued for the corresponding Chinese Patent Application No. 201410687092.5 with English Translation.

* cited by examiner

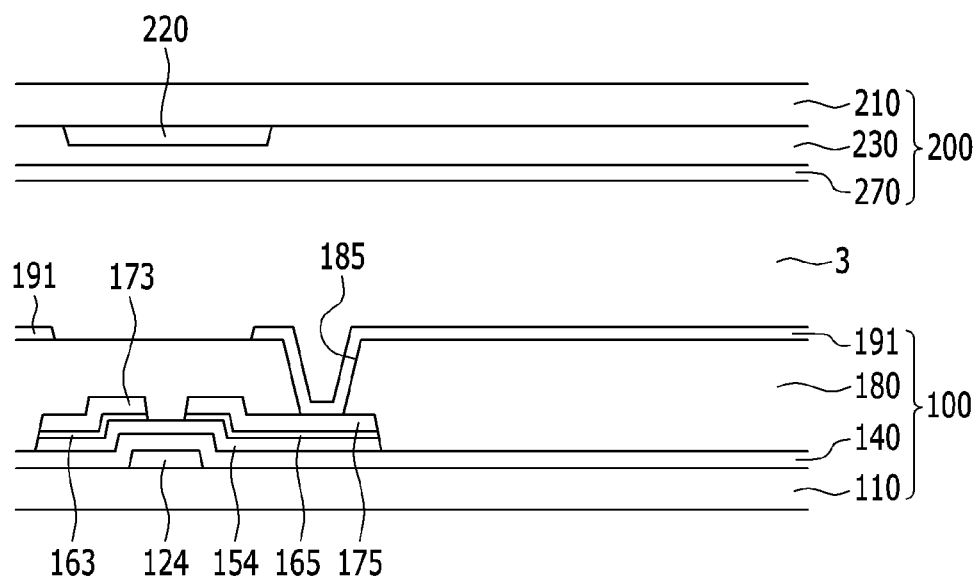

COMPOSITION FOR PREPARING POLYIMIDE, POLYIMIDE, AND ARTICLE INCLUDING SAME

CROSS-REFERENCE TO RELATED APPLICATIONS

This application claims priority to Korean Patent Application No. 10-2013-00144125, filed on Nov. 25, 2013, and Korean Patent Application No. 10-2014-0162857, filed on Nov. 20, 2014, and all the benefits accruing therefrom under 35 U.S.C. § 119, the contents of which are herein incorporated in their entirety by reference.

BACKGROUND

1. Field

This disclosure relates to a composition for preparing a polyimide, a polyimide prepared from the composition, and an article including the polyimide.

2. Description of the Related Art

Polyimide film is non-soluble film, which is resistant to high-temperatures, and does not oxidize upon exposure to heat. It is also resistant to radiation, low temperature and thus is suitable for application in a wide variety of heat-resistant high-tech materials for vehicle, aerospace, spaceship, electronic materials, such as insulating coating, insulating film, semiconductor, electrode protecting layer for thin film transistor-liquid crystal display (TFT-LCD), etc.

Glass has been widely used for the substrates for liquid crystal display, organic electro luminescent display devices, organic TFT, etc. However, flexible substrates have been researched in accordance with the need for lightness and flexibility of the substrates. There remains a need in high transparency, low thermal expansion, high heat resistance, low optical anisotropy materials that are desired for the flexible substrates for replacing glass.

SUMMARY

It has been discovered that transparent polyimide film may be used as a flexible substrate.

An embodiment relates to a composition for preparing a polyimide having high temperature stability, high transparency, and low optical anisotropy.

Another embodiment relates to a polyimide having high temperature stability, high transparency, and low optical anisotropy.

Yet another embodiment relates to an article having high temperature stability, high transparency, and low optical anisotropy.

Still another embodiment relates to an optical device including an article having high temperature stability, high transparency, and low optical anisotropy.

According to an embodiment, provided is a composition for preparing a polyimide including a tetracarboxylic dianhydride mixture including a tetracarboxylic dianhydride represented by Chemical Formula 1A, Chemical Formula 1B, or a combination thereof, a tetracarboxylic dianhydride represented by Chemical Formula 2, and a diamine represented by Chemical Formula 3:

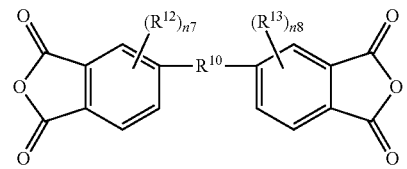

Chemical Formula 1A

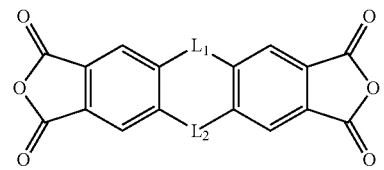

Chemical Formula 1B

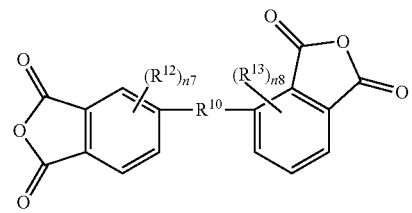

Chemical Formula 2 wherein in Chemical Formulae 1A, 1B, and 2, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are independently a hydrogen or a C1 to C10 aliphatic organic group, $L_1$ and $L_2$ are the same or different and are independently a single bond or a C1-C5 alkylene group, and n7 and n8 are the same or different and are independently an integer ranging from 0 to 3.

The diamine may be represented by Chemical Formula 3:

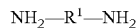
Chemical Formula 3

In Chemical Formula 3, $R^1$ is a substituted or unsubstituted C1 to C30 aliphatic organic group, or a substituted or unsubstituted C6 to C30 aromatic organic group, wherein the aliphatic organic group may include a substituted or unsubstituted C1 to C30 alkylene group, a substituted or unsubstituted C2 to C30 alkenylene group, a substituted or unsubstituted C2 to C30 alkynylene group, a substituted or unsubstituted C3 to C30 cycloalkylene group, wherein the cycloalkylene group may include one cycloalkylene ring, or two or more cycloalkylene rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, and wherein the aromatic organic group may include one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH.

In an embodiment, substituent $R^{10}$ in Chemical Formula 1A may be a substituted or unsubstituted C1 to C15 alkylene group, a substituted or unsubstituted C1 to C15 fluoroalkylene group, a substituted or unsubstituted C1 to C15 heteroalkylene group, a substituted or unsubstituted C3 to C15 cycloalkylene group, a substituted or unsubstituted C3 to C15 heterocycloalkylene group, a substituted or unsubstituted C6 to C15 arylene group, or a substituted or unsubstituted C2 to C15 heteroarylene group.

In another embodiment, substituent $R^{10}$ in Chemical Formula 1A may be a substituted or unsubstituted C1 to C15 fluoroalkylene group.

Chemical Formula 1A may be represented by Chemical Formula 4 or Chemical Formula 5, and Chemical Formula 2 may be represented by Chemical Formula 6 or Chemical Formula 7:

Chemical Formula 4

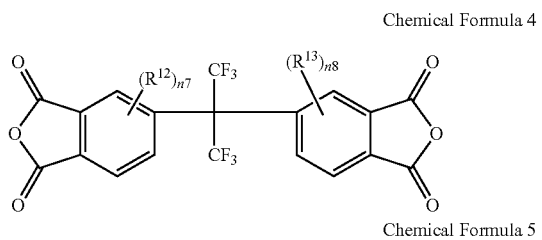

Chemical Formula 5

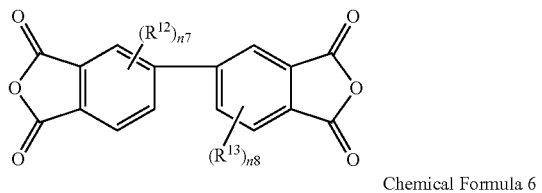

Chemical Formula 6

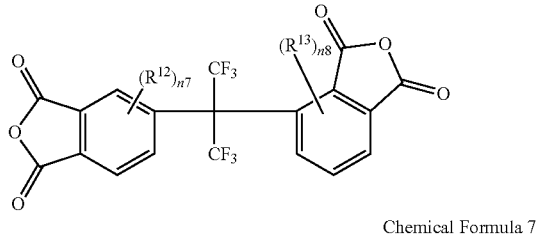

Chemical Formula 7

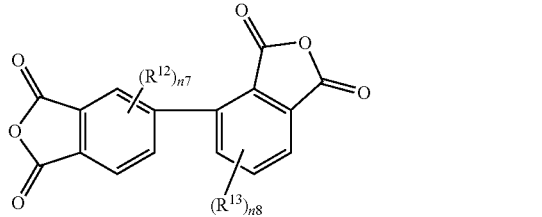

In Chemical Formulae 4 to 7, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group a group of formula —OR$^{200}$, wherein R$^{200}$ is a C1 to C10 aliphatic organic group, or a silyl group of formula —SiR$^{201}$R$^{202}$R$^{203}$, wherein R$^{201}$, R$^{202}$, and R$^{203}$ are the same or different and are independently a hydrogen or a C1 to C10 aliphatic organic group, and n7 and n8 are the same or different and are independently an integer ranging from 0 to 3.

Chemical Formula 1A may also be represented by Chemical Formula 18:

Chemical Formula 18

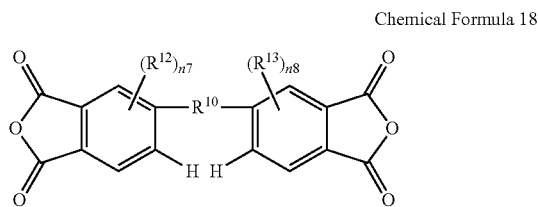

wherein in Chemical Formula 18, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{205}$, wherein R$^{205}$ is a C1 to C10 aliphatic organic group, or a silyl group of formula —SiR$^{209}$R$^{210}$R$^{211}$, wherein R$^{209}$, R$^{210}$, and R$^{211}$ are the same or different and are independently a hydrogen or a C1 to C10 aliphatic organic group, and n7 and n8 are the same or different and are independently an integer ranging from 0 to 2.

The tetracarboxylic acid dianhydride represented by Chemical Formula 1A may be one or more selected from 3,3',4,4'-biphenyltetracarboxylic dianhydride, 3,3',4,4'-diphenylsulfone tetracarboxylic dianhydride, 4,4'-(hexafluoroisopropylidene)diphthalic anhydride, and 4,4'-oxydiphthalic anhydride,.

The tetracarboxylic acid dianhydride represented by Chemical Formula 2 may be one or more selected from 2,3,3',4'-biphenyltetracarboxylic dianhydride, 2,3,3',4'-diphenylsulfone tetracarboxylic dianhydride, and 3,4'-oxydiphthalic anhydride.

In the composition, the tetracarboxylic dianhydride represented by Chemical Formula 2 may be included in an amount of greater than or equal to about 10 mole % and less than about 53 mole %, based on the total mole numbers of the tetracarboxylic dianhydride mixture.

In the composition, the tetracarboxylic dianhydride represented by Chemical Formula 2 may be included in an amount of greater than or equal to about 25 mole % and less than or equal to about 52 mole %, based on the total mole numbers of the tetracarboxylic dianhydride mixture.

In the composition, the tetracarboxylic dianhydride mixture and the diamine may be present in a mole ratio of 1:1.

The tetracarboxylic dianhydride represented by Chemical Formula 1A may be 3,3',4,4'-biphenyl tetracarboxylic dianhydride (BPDA).

The tetracarboxylic dianhydride represented by Chemical Formula 2 may be 2,3,3',4'-biphenyltetracarboxylic dianhydride (a-BPDA).

The diamine represented by Chemical Formula 3 may be at least one selected from chemical formulae:

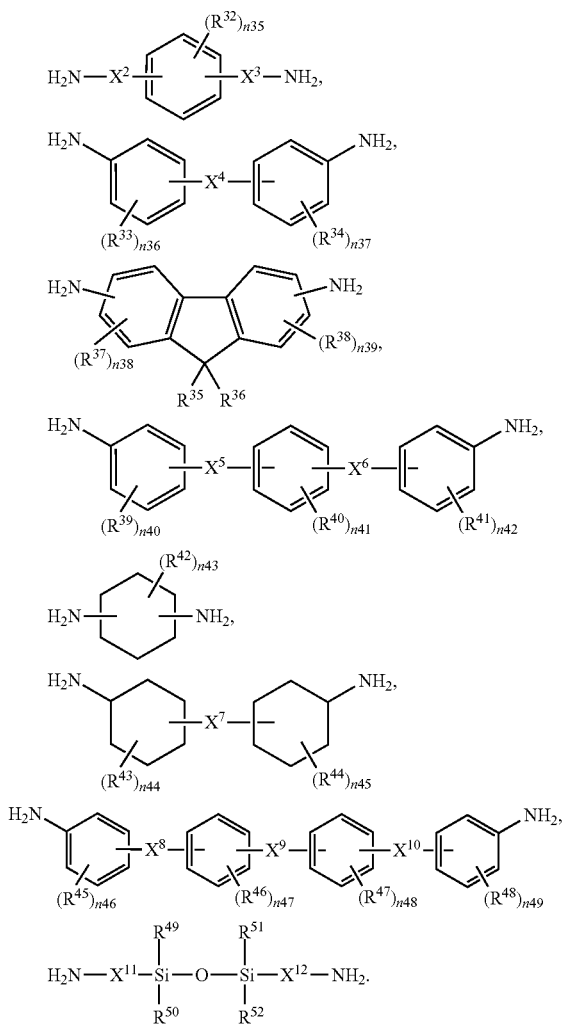

In the chemical formulae, $R^{32}$ to $R^{52}$ are the same or different, and are independently a halogen, a nitro group, a cyano group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C2 to C15 alkanoyl group, a substituted or unsubstituted C2 to C15 alkylcarboxy group, a substituted or unsubstituted C2 to C15 alkoxycarbonyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C3 to C10 cycloalkylene group, a substituted or unsubstituted C6 to C15 arylene group, $SO_2$, O, CO, a combination thereof, or a group selected from chemical formulae:

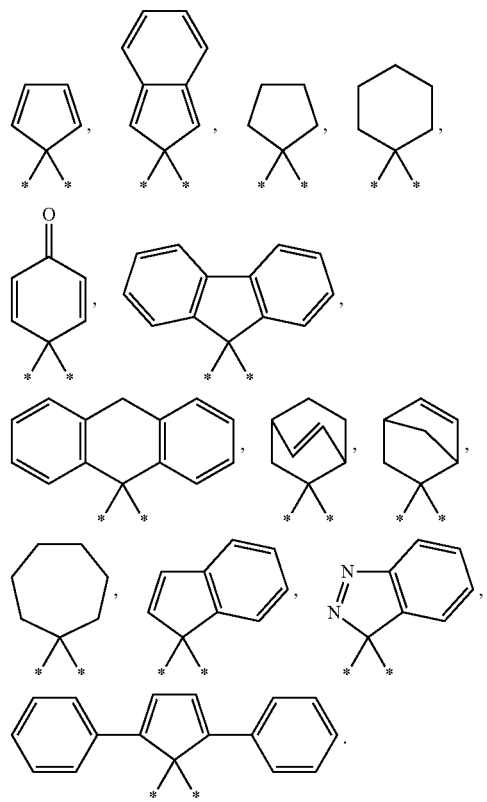

n35 to n37, and n40 to n49 are an integer of 0 to 4, and n38 and n39 are an integer of 0 to 3.

The diamine may be at least one selected from chemical formulae:

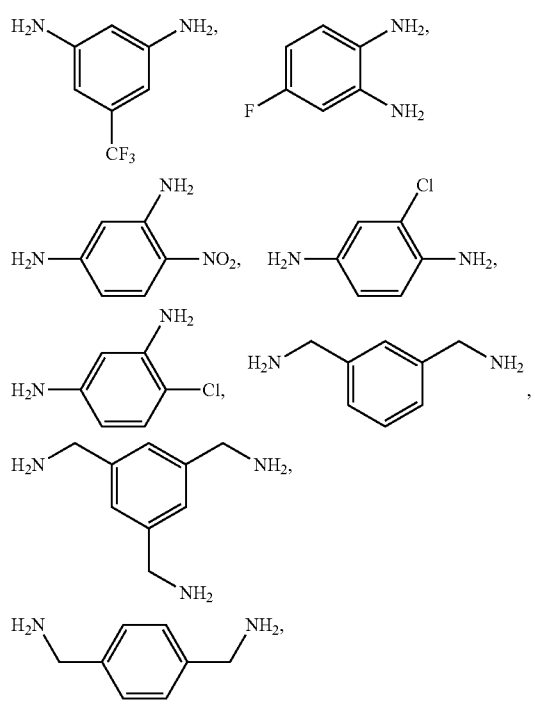

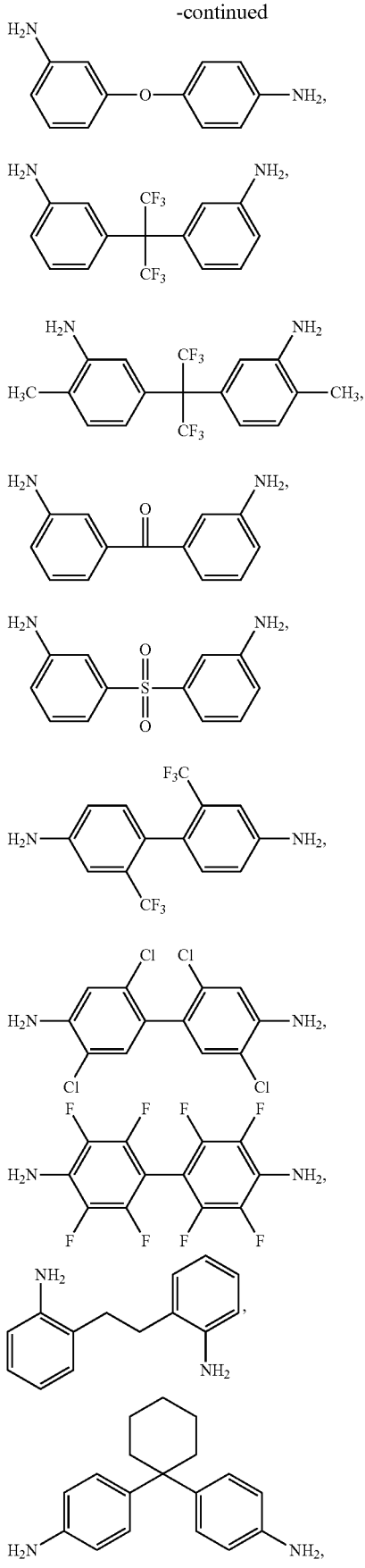
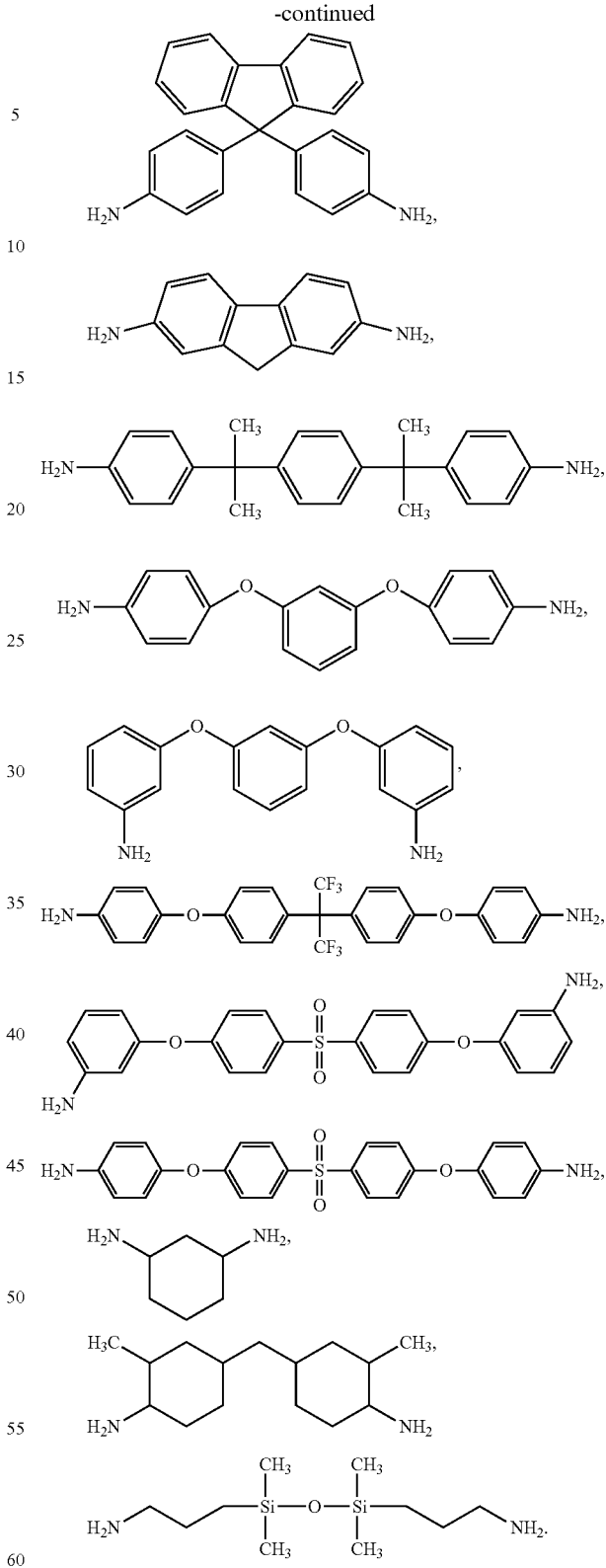
The diamine may be 2,2'-bis(trifluoromethyl)benzidine (TFDB).
According to another embodiment, provided is a polyimide represented by Chemical Formula 8, or a polyamic acid precursor of the polyimide:

Chemical Formula 8

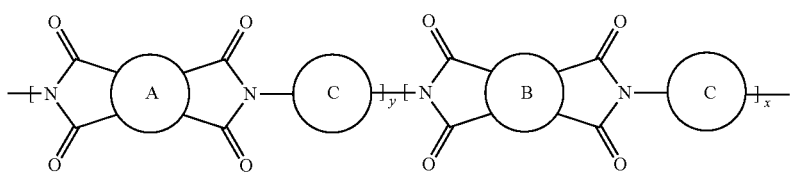

In Chemical Formula 8,

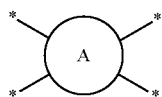

is represented by Chemical Formula 9A or Chemical Formula 9B,

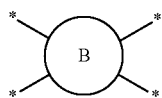

is represented by Chemical Formula 10:

Chemical Formula 9A

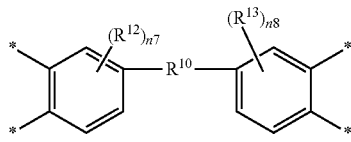

Chemical Formula 9B

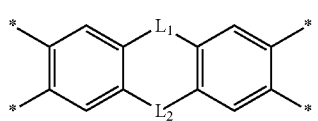

Chemical Formula 10

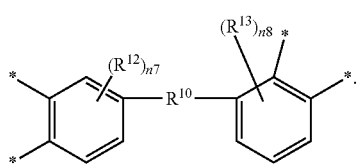

In Chemical Formulae 9A, 9B, and 10, $R^{10}$, $R^{12}$, $R^{13}$, $L_1$, $L_2$, n7, and n8 are defined as in Chemical Formulae 1A, 1B and 2, and

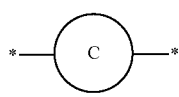

is at least one selected from chemical formulae:

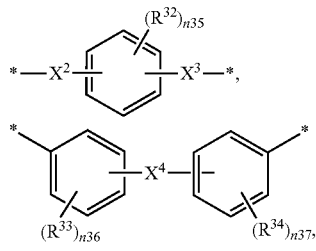

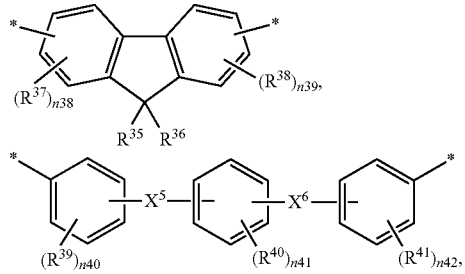

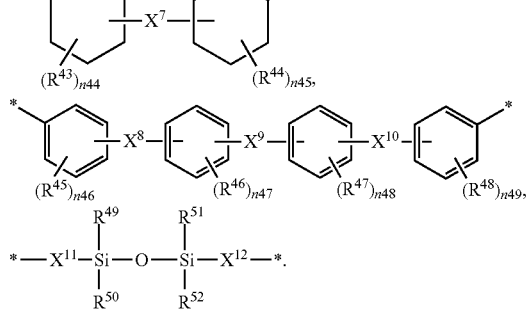

In the chemical formulae, $R^{32}$ to $R^{52}$ are the same or different, and are independently a halogen, a nitro group, a cyano group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C2 to C15 alkanoyl group, a substituted or unsubstituted C2 to C15 alkylcarboxy group, a substituted or unsubstituted C2 to C15 alkoxycarbonyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C3 to C10 cycloalkylene group, a substituted or unsubstituted C6 to C15 arylene group, $SO_2$, O, CO, a combination thereof, or a group selected from chemical formulae:

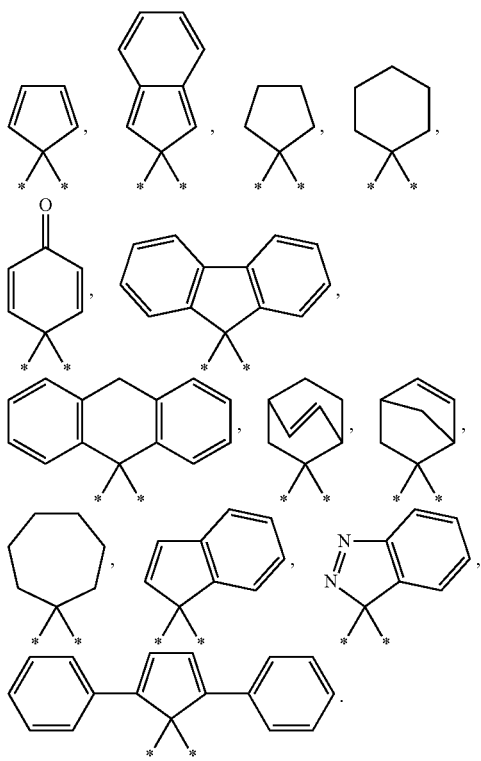

n35 to n37, and n40 to n49 are an integer of 0 to 4, and n38 and n39 are an integer of 0 to 3.

In Chemical Formula 8, x is $0.10 \leq x < 0.53$, for example, $0.25 \leq x \leq 0.52$.

In an embodiment, substituent $R^{10}$ in Chemical Formula 9A may be a substituted or unsubstituted C1 to C15 alkylene group, a substituted or unsubstituted C1 to C15 fluoroalkylene group, a substituted or unsubstituted C1 to C15 heteroalkylene group, a substituted or unsubstituted C3 to C15 cycloalkylene group, a substituted or unsubstituted C3 to C15 heterocycloalkylene group, a substituted or unsubstituted C6 to C15 arylene group, or a substituted or unsubstituted C2 to C15 heteroarylene group.

In another embodiment, substituent $R^{10}$ in Chemical Formula 9A may be a substituted or unsubstituted C1 to C15 fluoroalkylene group.

Chemical Formula 9A may be represented by Chemical Formula 11 or Chemical Formula 12, and Chemical Formula 10 may be represented by Chemical Formula 13 or Chemical Formula 14:

Chemical Formula 11

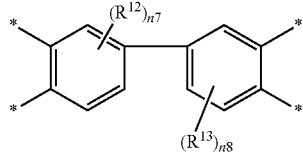

Chemical Formula 12

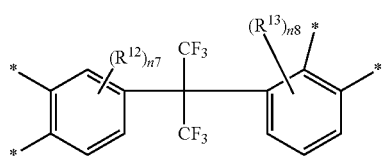

Chemical Formula 13

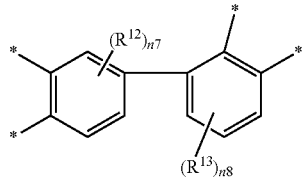

Chemical Formula 14

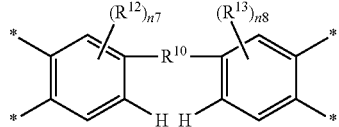

In Chemical Formulae 11 to 14, $R^{12}$, $R^{13}$, n7, and n8 are defined as in Chemical Formulae 1A and 2.

Chemical Formula 9A may also be represented by Chemical Formula 19:

Chemical Formula 19

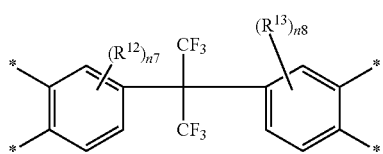

wherein in Chemical Formula 19, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula $-OR^{205}$, wherein $R^{205}$ is a C1 to C10 aliphatic organic group, or a silyl group of formula $-SiR^{209}R^{210}R^{211}$, wherein $R^{209}$, $R^{210}$, and $R^{211}$ are the same or different and are independently a hydrogen or a C1 to C10 aliphatic organic group, and n7 and n8 are the same or different and are independently an integer ranging from 0 to 2.

The group

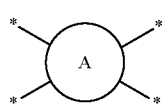

may be represented by Chemical Formula 15:

Chemical Formula 15

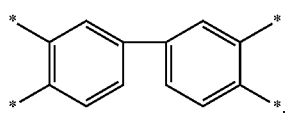

The group

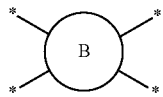

may be represented by Chemical Formula 16:

Chemical Formula 16

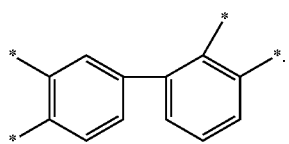

The group

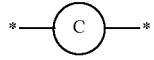

may be represented by Chemical Formula 17:

Chemical Formula 17

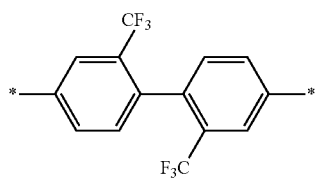

According to yet another embodiment, provided is an article prepared from the composition or from the polyimide.

The article may be a film, a fiber, a coating material, or an adhesive.

In an embodiment, the article may be a film, wherein the thickness of the film may be about 10 micrometers, and the out-of-plane retardation of the film may be less than or equal to about 700 nanometers.

In another embodiment, the article may be a film, wherein the thickness of the film may be about 10 micrometers, and the yellowness index of the film may be less than about 4%.

The article may have a transmittance for light of greater than or equal to about 80% at a wavelength of about 430 nanometers.

The article may have a yellowness index (YI) of less than about 4%.

The article may have an out-of-plane retardation of less than or equal to about 700 nanometers.

According to still another embodiment, provided is a display device including the article.

The display device may be a liquid crystal display device, an organic light emitting device, or a complementary metal-oxide semiconductor.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 1 is a cross-sectional view of a liquid crystal display (LCD) in accordance with an embodiment.

DETAILED DESCRIPTION

This disclosure will be described more fully hereinafter with reference to the accompanying drawings, in which some but not all embodiments are shown. In addition, dimensional ratios in the drawings may be exaggerated and different from actual ratios for ease of explanation. This disclosure may, however, be embodied in many different forms and is not to be construed as limited to the exemplary embodiments set forth herein. Rather, these embodiments are provided so that this disclosure will fully convey the scope of the invention to those skilled in the art. Thus, in some exemplary embodiments, well-known technologies are not specifically explained to avoid ambiguous understanding of the present inventive concept. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "mixture" is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ ($R^{102}$), wherein $R^{100}$, $R^{101}$, and $R^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "alkylcarboxy group" refers to a C2 to C30 alkylcarboxy group, for example, a C2 to C18 alkylcarboxy group, the term "alkoxycarbonyl group" refers to a C2 to C30 alkoxycarbonyl group, for example, a C2 to C18 alkoxycarbonyl group, the term "alkanoyl group" refers to a C2 to C30 alkanoyl group, for example, a C2 to C18 alkanoyl group, the term "aryl group" refers to a C6 to C30 aryl group, and for example, a C6 to C18 aryl group, the term "alkenyl group" refers to a C2 to C30 alkenyl group, for example a C2 to C18 alkenyl group, the term "alkynyl group" refers to a C2 to C30 alkynyl group, for example, a C2 to C18 alkynyl group, the term "alkylene group" refers to a C1 to C30 alkylene group, for example a C1 to C18 alkylene group, and the term "arylene group" refers to a C6 to C30 arylene group, for example, a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein, when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, for example, through S(=O)$_2$. A non-limiting example of "aromatic organic group" may be a C6 to C30 aryl group or a C6 to C30 arylene group, for example, a C6 to C16 aryl group or a C6 to C16 arylene group such as phenylene.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, when a definition is not otherwise provided, the term "fluoroalkyl" indicates a group derived from a completely saturated, branched or unbranched (or a straight or linear) hydrocarbon including at least one fluorine atom and having a specified number of carbon atoms.

As used herein, when a definition is not otherwise provided, the term "heteroalkyl" indicates a group derived from a completely saturated, branched or unbranched (or a straight or linear) hydrocarbon wherein one or more of the carbon atoms are replaced with a heteroatom selected from O, S, N, P, and Si and having a specified number of carbon atoms.

As used herein, when a definition is not otherwise provided, the term "alkanoyl" represents "alkyl-C(=O)—", wherein the term "alkyl" has the same meaning as described above.

As used herein, when a definition is not otherwise provided, the term "alkylcarboxy" represents "alkyl-C(=O)O—", wherein the term "alkyl" has the same meaning as described above.

As used herein, when a definition is not otherwise provided, the term "alkoxycarbonyl" represents "alkyl-OC(=O)—", wherein the term "alkyl" has the same meaning as described above.

As used herein, the term "cycloalkyl group" refers to a monovalent group having one or more saturated rings in which all ring members are carbon and having a specified number of carbon atoms.

As used herein, the term "heterocycloalkyl group" refers to a cycloalkyl group as defined above, wherein one or more of the ring carbon atoms are replaced with a heteroatom selected from O, S, N, P, and Si and having a specified number of carbon atoms.

As used herein, the term "cycloalkoxy group" refers to "cycloalkyl-O—", wherein the term "cycloalkyl" has the same meaning as described above.

As used herein, when a definition is not otherwise provided, the term "aryl" group, which is used alone or in combination, indicates an aromatic hydrocarbon group containing at least one ring and having a specified number of carbon atoms. The term "aryl" is construed as including a group with an aromatic ring fused to at least one cycloalkyl ring.

As used herein, the term "aryloxy group" refers to "aryl-O—", wherein the term "aryl" has the same meaning as described above.

As used herein, when a definition is not otherwise provided, the term "heteroaryl" group, which is used alone or in combination, refers to an aryl group, wherein one or more carbon atoms is (are) substituted with a heteroatom selected from nitrogen (N), oxygen (O), phosphorus (P), and sulfur (S) and having a specified number of carbon atoms.

As used herein, when a definition is not otherwise provided, the term "alkylene" indicates a divalent group respectively derived from the "alkyl" group.

As used herein, when a definition is not otherwise provided, the term "fluoroalkylene" indicates a divalent group respectively derived from the "fluoroalkyl" group.

As used herein, when a definition is not otherwise provided, the term "heteroalkylene" indicates a divalent group respectively derived from the "heteroalkyl" group.

As used herein, when a definition is not otherwise provided, the term "cycloalkylene" indicates a divalent group respectively derived from the "cycloalkyl" group.

As used herein, when a definition is not otherwise provided, the term "heterocycloalkylene" indicates a divalent group respectively derived from the "heterocycloalkyl" group.

As used herein, when a definition is not otherwise provided, the term "arylene" indicates a divalent group respectively derived from the "aryl" group.

As used herein, when a definition is not otherwise provided, the term "heteroarylene" indicates a divalent group respectively derived from the "heteroaryl" group.

In addition, in the specification, the mark "*" may refer to a point of attachment to another atom, group, or unit.

Polyimide film refers to a high-temperature resistant film of polyimide, which is prepared by polymerizing an aromatic dianhydride and an aromatic diamine or an aromatic diisocyanate in a solution state to obtain a polyamic acid derivative, and by imidizing the polyamic acid derivative by dehydrative cyclization. However, the polyimides have yellow colors due to high aromatic ring content, which causes low transmittance at visible regions and high birefringence, thus making it difficult for the polyimides to be used as an optical element. Therefore, a polyimide having a low coefficient of thermal expansion, high heat-resistance, low optical anisotropy, i.e., low out-of-plane retardation ($R_{th}$), and high transmittance for light is still desired.

According to an embodiment, provided is a composition for preparing a polyimide including a tetracarboxylic dianhydride mixture including a tetracarboxylic dianhydride represented by Chemical Formula 1A, Chemical Formula 1B, or a combination thereof, a tetracarboxylic dianhydride represented by Chemical Formula 2, and a diamine:

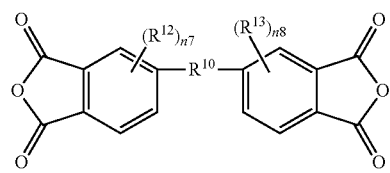

Chemical Formula 1A

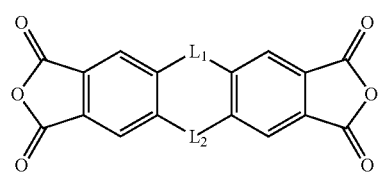

Chemical Formula 1B

Chemical Formula 2

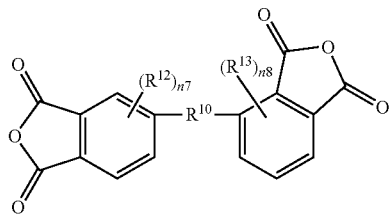

wherein in Chemical Formulae 1A, 1B, and 2, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are independently a hydrogen or a C1 to C10 aliphatic organic group, $L_1$ and $L_2$ are the same or different and are independently a single bond or a C1-C5 alkylene group, and n7 and n8 are the same or different and are independently an integer ranging from 0 to 3.

In an embodiment, substituent $R^{10}$ in Chemical Formula 1A may be a substituted or unsubstituted C1 to C15 alkylene group, a substituted or unsubstituted C1 to C15 fluoroalkylene group, a substituted or unsubstituted C1 to C15 heteroalkylene group, a substituted or unsubstituted C3 to C15 cycloalkylene group, a substituted or unsubstituted C3 to C15 heterocycloalkylene group, a substituted or unsubstituted C6 to C15 arylene group, or a substituted or unsubstituted C2 to C15 heteroarylene group.

In another embodiment, substituent $R^{10}$ in Chemical Formula 1A may be a substituted or unsubstituted C1 to C15 fluoroalkylene group.

Chemical Formula 1A may be represented by Chemical Formula 4, or Chemical Formula 5, and Chemical Formula 2 may be represented by Chemical Formula 6 or Chemical Formula 7:

Chemical Formula 4

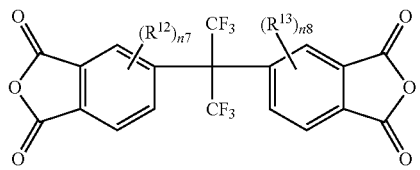

Chemical Formula 5

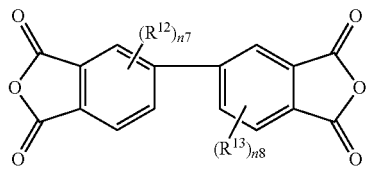

Chemical Formula 6

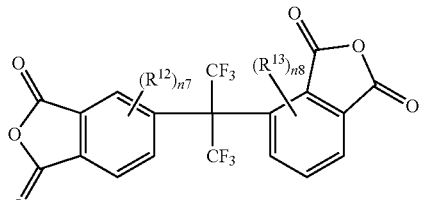

Chemical Formula 7

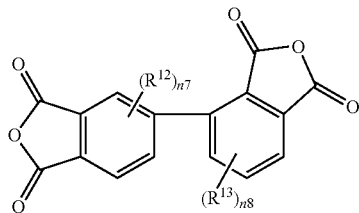

In Chemical Formulae 4 to 7, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group a group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different and are independently a hydrogen or a C1 to C10 aliphatic organic group, and n7 and n8 are the same or different and are independently an integer ranging from 0 to 3.

The composition according to an embodiment includes a tetracarboxylic dianhydride having a planar structure represented by Chemical Formula 1A, Chemical Formula 1B, or a combination thereof, as well as a tetracarboxylic dianhydride having a titled (or folded) dihedral structure represented by Chemical Formula 2. It has been unexpectedly discovered that the polyimide prepared from the composition has difficulty in forming a chain alignment among the polymer chains. This property makes it difficult for the polyimide to form a charge transfer complex among chains, and results in the polyimide having a low yellowness index and high transparency, as shown in the Examples. Further, the polyimide prepared from the composition may have optical anisotropic morphology due to the difficulty of making a charge transfer complex, which may result in a polyimide film having a high transmittance for light and a low out-of-plane retardation ($R_{th}$).

Therefore, the tetracarboxylic dianhydride represented by Chemical Formula 1A may include any anhydride of Chemical Formula 1A having a planar structure, and may be, for example, at least one selected from 3,3',4,4'-biphenyl tetracarboxylic dianhydride (BPDA), 3,3',4,4'-diphenylsulfone tetracarboxylic dianhydride (DSDA), 4,4'-oxydiphthalic anhydride (ODPA), 4,4'-(hexafluoroisopropylidene)diphthalic anhydride (6FDA), or a combination thereof.

The tetracarboxylic dianhydride represented by Chemical Formula 2 may include any anhydride of Chemical Formula 2 having a tilted dihedral structure, and may be, for example, at least one selected from 2,3,3',4'-biphenyltetracarboxylic dianhydride (a-BPDA), 2,3,3',4',-diphenylsulfone tetracarboxylic dianhydride, 3,4'-oxydiphthalic anhydride, or a combination thereof.

In an embodiment, the tetracarboxylic dianhydride represented by Chemical Formula 1A may include 3,3',4,4'- biphenyl tetracarboxylic dianhydride (BPDA), and the tetracarboxylic dianhydride represented by Chemical Formula 2 may include 2,3,3',4'-biphenyltetracarboxylic dianhydride (a-BPDA).

As used herein, the tetracarboxylic dianhydride, such as the tetracarboxylic dianhydride represented by Chemical Formula 1A or Chemical Formula 2, has a planar structure when the absolute value of the dihedral angle between two dicarboxylic anhydride fragments constituting the molecule of the tetracarboxylic dianhydride is less than about 15°, for example, less than about 10°, for example, less than about 5°, and for example, less than about 1°.

As used herein, the tetracarboxylic dianhydride, such as the tetracarboxylic dianhydride represented by Chemical Formula 1A or Chemical Formula 2, has a tilted structure when the absolute value of the dihedral angle between two dicarboxylic anhydride fragments constituting the molecule of the tetracarboxylic dianhydride is greater than about 15°.

In the composition, the tetracarboxylic dianhydride represented by Chemical Formula 1A and the tetracarboxylic dianhydride represented by Chemical Formula 2 may be included at a mole ratio of about 1:99 to about 99:1, for example, at a mole ratio of about 10:90 to about 90:10, or at a mole ratio of about 20:80 to about 80:20.

In an embodiment, the tetracarboxylic dianhydride represented by Chemical Formula 2 may be included in an amount of greater than or equal to about 10 mole % and less than about 53 mole %, for example, greater than or equal to about 25 mole % and less than or equal to about 52 mole %, based on the total moles number in the tetracarboxylic dianhydride mixture.

Within the above ranges, an article prepared from the composition may have good optical properties, such as, for example, high transmittance for light, low yellowness index, low out-of-plane retardation ($R_{th}$), and the like, as well as good thermal properties, such as, for example, high glass transition temperature, high degradation temperature, and the like.

In a specific embodiment, any substituents on the benzene rings that are ortho to $R^{10}$ in Chemical formula 1A are selected so as to not significantly adversely affect the planarity of the molecule as described above. In general, small substituents are preferred, such as hydrogen or fluorine. In an embodiment, all positions ortho to $R^{10}$ in Chemical formula 1A are fluorine or hydrogen. In a preferred embodiment, Chemical Formula 1A may be represented by Chemical Formula 18:

Chemical Formula 18

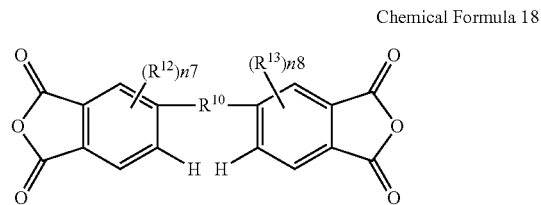

wherein in Chemical Formula 18, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula $-OR^{205}$, wherein $R^{205}$ is a C1 to C10 aliphatic organic group, or a silyl group of formula $-SiR^{209}R^{210}R^{211}$, wherein $R^{209}$, $R^{210}$, and $R^{211}$ are the same or different and are independently a hydrogen or a C1 to C10 aliphatic organic group, and n7 and n8 are the same or different and are independently an integer ranging from 0 to 2.

Planarity may be maximized where all substituents ortho to $R^{10}$ in Chemical formula 1A are hydrogen.

The composition for preparing a polyimide further comprises a diamine. The diamine may be any diamine that can reacts with the tetracarboxylic dianhydride to form an imide, and may include a diamine represented by Chemical Formula 3:

$$NH_2-R^1-NH_2 \qquad \text{Chemical Formula 3}$$

In Chemical Formula 3, $R^1$ is a substituted or unsubstituted C1 to C30 aliphatic organic group, or a substituted or unsubstituted C6 to C30 aromatic organic group, wherein the aliphatic organic group may include a substituted or unsubstituted C1 to C30 alkylene group, a substituted or unsubstituted C2 to C30 alkenylene group, a substituted or unsubstituted C2 to C30 alkynylene group, a substituted or unsubstituted C3 to C30 cycloalkylene group, wherein the cycloalkylene group may include one cycloalkylene ring, or two or more cycloalkylene rings linked through a single bond or through a functional group selected from a fluorenylene group, O, S, C(=O), CH(OH), S(=O)$_2$, Si(CH$_3$)$_2$, (CH2)$_p$ wherein 1≤p≤10, (CF$_2$)$_q$ wherein 1≤q≤10, C(CH$_3$)$_2$, C(CF$_3$)$_2$, and C(=O)NH, and wherein the aromatic organic group may include one aromatic ring, two or more aromatic rings fused together to provide a condensed ring system, or two or more aromatic rings linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH.

The diamine represented by Chemical Formula 3 may be at least one selected from the following chemical formulae:

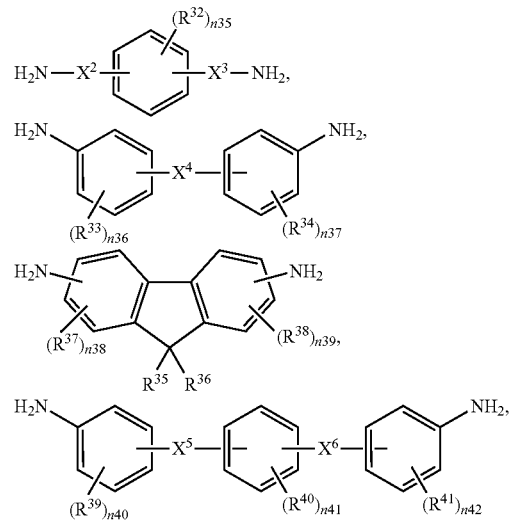

-continued

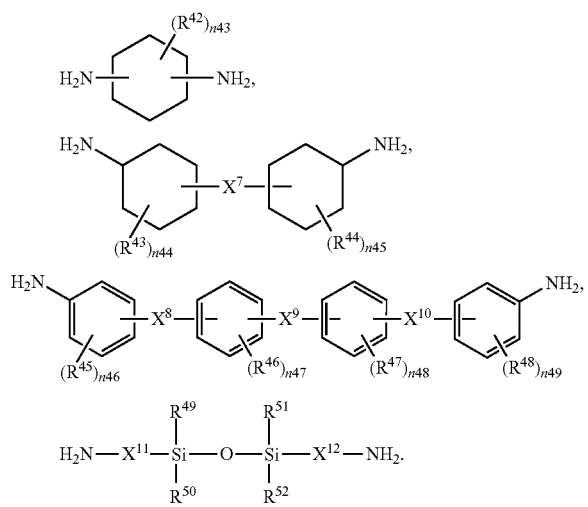

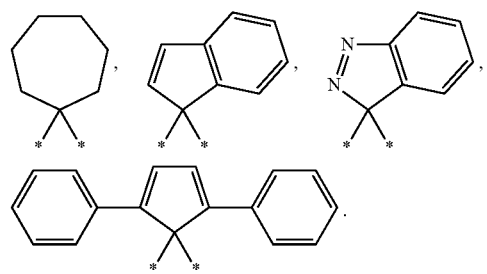

In the above chemical formulae, $R^{32}$ to $R^{52}$ are the same or different, and are independently a halogen, a nitro group, a cyano group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C2 to C15 alkanoyl group, a substituted or unsubstituted C2 to C15 alkylcarboxy group, a substituted or unsubstituted C2 to C15 alkoxycarbonyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C3 to C10 cycloalkylene group, a substituted or unsubstituted C6 to C15 arylene group, $SO_2$, O, CO, a combination thereof, or a group selected from chemical formulae:

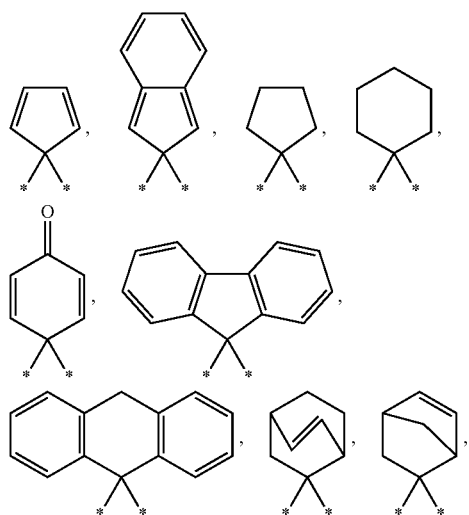

n35 to n37, and n40 to n49 are an integer of 0 to 4, and n38 and n39 are an integer of 0 to 3.

The diamine may be at least one selected from the following chemical formulae:

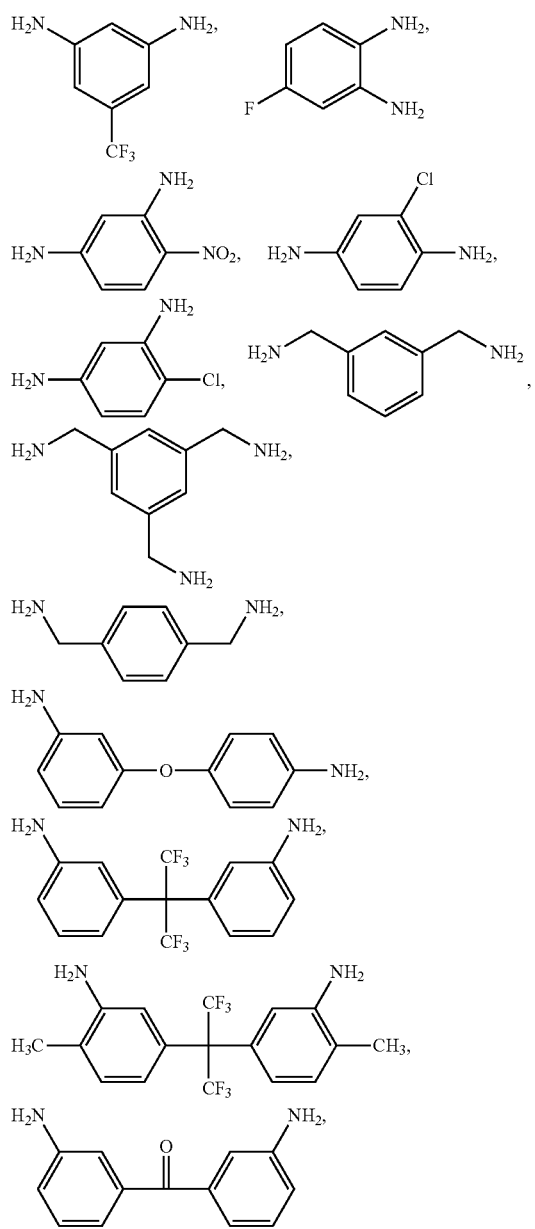

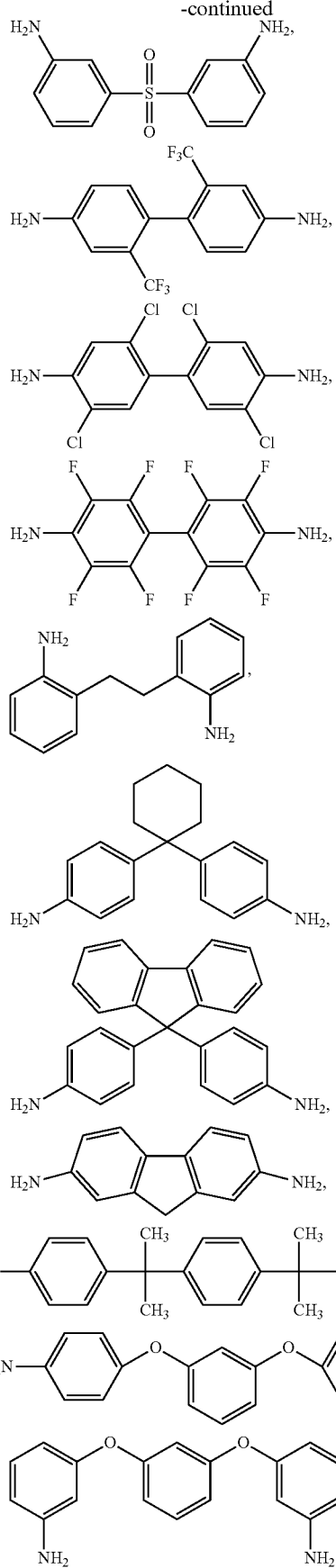

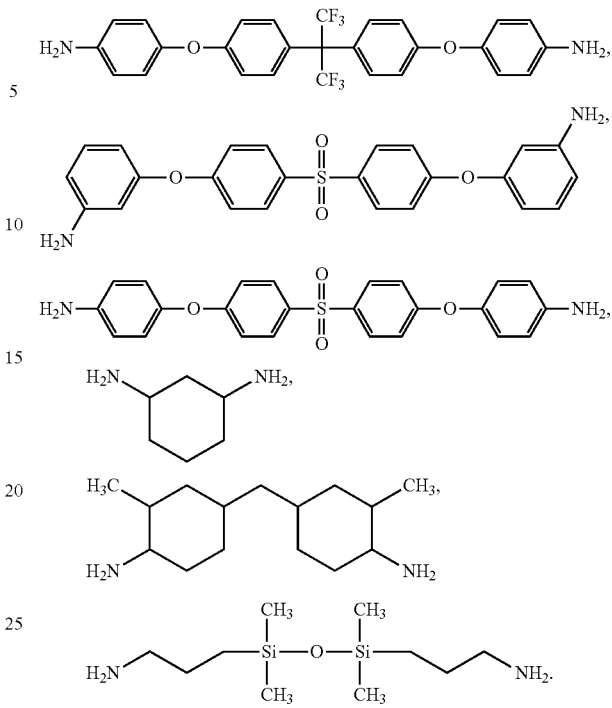

In an embodiment, the diamine may be 2,2'-bis(trifluoromethyl)benzidine (TFDB).

In the composition according to an embodiment, the tetracarboxylic dianhydride and the diamine may react at a mole ratio of 1:1 to prepare a polyimide.

According to another embodiment, provided is a polyimide represented by Chemical Formula 8, or a polyamic acid precursor of the polyimide:

Chemical Formula 8

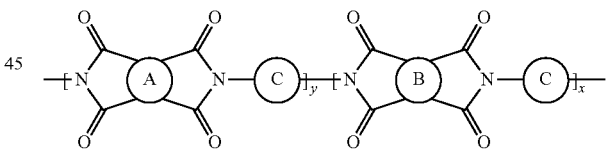

In Chemical Formula 8,

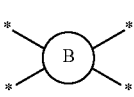

may be represented by Chemical Formula 9A or Chemical Formula 9B, may be represented by Chemical Formula 10:

Chemical Formula 9A

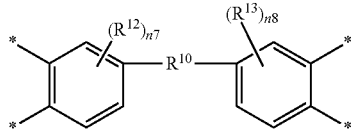

Chemical Formula 9B

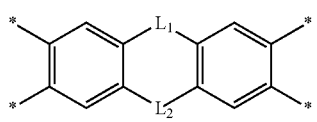

Chemical Formula 10

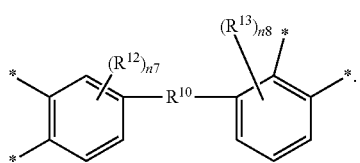

In Chemical Formulae 9A, 9B, and 10, $R^{10}$, $R^{12}$, $R^{13}$, $L_1$, $L_2$, n7 and n8 are defined as in Chemical Formulae 1A, 1B, and 2, and

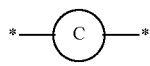

may be at least one selected from the following chemical formulae:

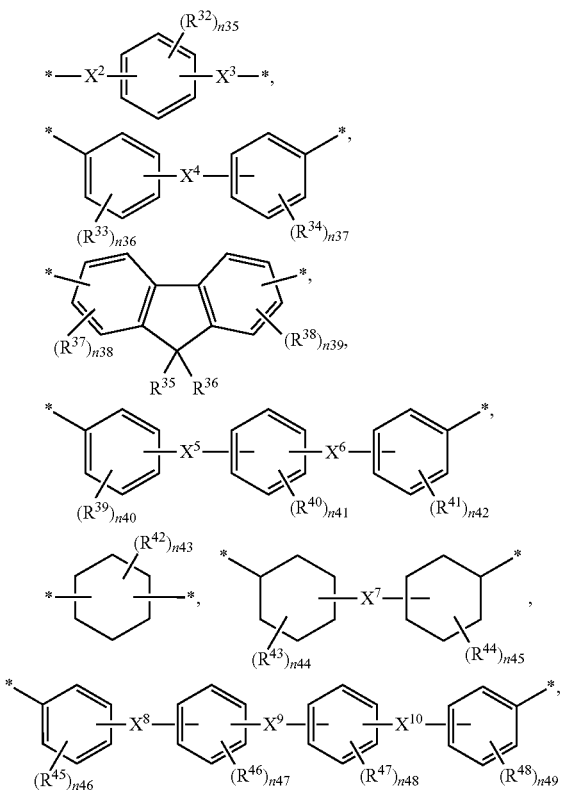

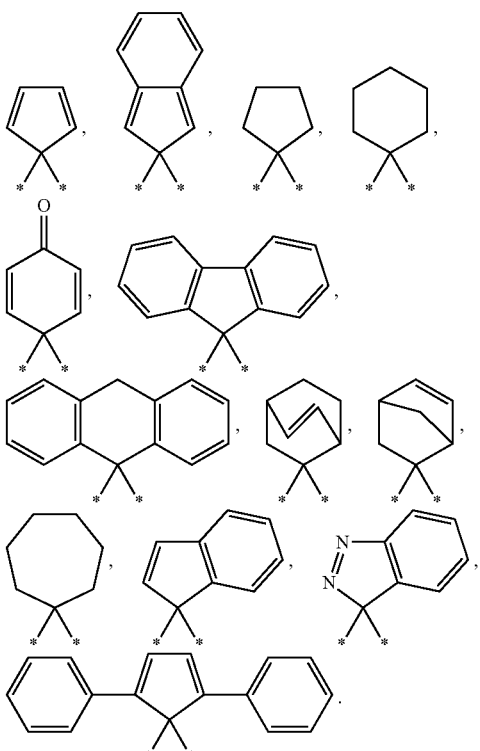

In the above chemical formulae,
$R^{32}$ to $R^{52}$ are the same or different, and are independently a halogen, a nitro group, a cyano group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C2 to C15 alkanoyl group, a substituted or unsubstituted C2 to C15 alkylcarboxy group, a substituted or unsubstituted C2 to C15 alkoxycarbonyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{12}$ are the same or different, and are independently a single bond, a substituted or unsubstituted C1 to C10 alkylene group, a substituted or unsubstituted C3 to C10 cycloalkylene group, a substituted or unsubstituted C6 to C15 arylene group, $SO_2$, O, CO, a combination thereof, or a group selected from chemical formulae:

n35 to n37, and n40 to n49 are an integer of 0 to 4, and n38 and n39 are an integer of 0 to 3.

In Chemical Formula 8, x and y indicate the mole fractions of each corresponding structure unit in the polymer, and x is 0<x<1, and y=1-x.

In an embodiment, x may be 0.10≤x<0.53, for example, 0.25≤x≤0.52.

In an embodiment, substituent $R^{10}$ in Chemical Formula 9A may be a substituted or unsubstituted C1 to C15 alkylene group, a substituted or unsubstituted C1 to C15 fluoroalkylene group, a substituted or unsubstituted C1 to C15 heteroalkylene group, a substituted or unsubstituted C3 to C15 cycloalkylene group, a substituted or unsubstituted C3 to C15 heterocycloalkylene group, a substituted or unsubstituted C6 to C15 arylene group, or a substituted or unsubstituted C2 to C15 heteroarylene group.

In another embodiment, substituent $R^{10}$ in Chemical Formula 9A may be a substituted or unsubstituted C1 to C15 fluoroalkylene group.

Chemical Formula 9A may be represented by Chemical Formula 11 or Chemical Formula 12, and Chemical Formula 10 may be represented by Chemical Formula 13 or Chemical Formula 14:

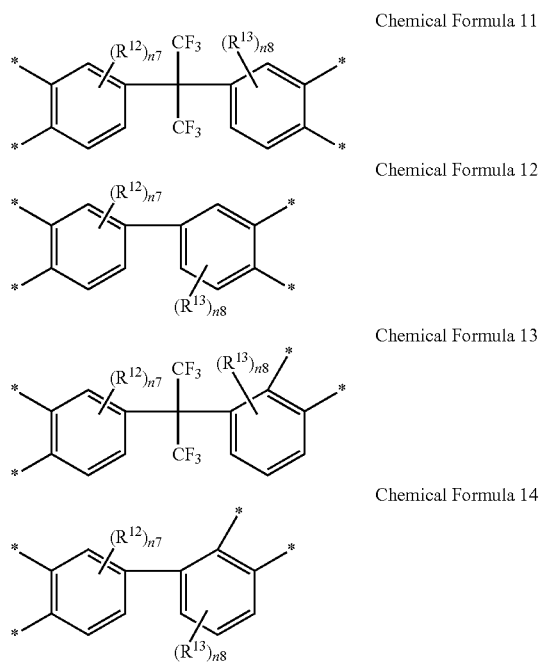

Chemical Formula 11

Chemical Formula 12

Chemical Formula 13

Chemical Formula 14

In Chemical Formulae 11 to 14, $R^{12}$, $R^{13}$, n7 and n8 are defined as in Chemical Formulae 1A and 2.

Chemical Formula 9A may also be represented by Chemical Formula 19:

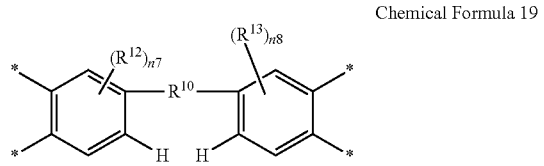

Chemical Formula 19 wherein in Chemical Formula 19, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —$OR^{205}$, wherein $R^{205}$ is a C1 to C10 aliphatic organic group, or a silyl group of formula —$SiR^{209}R^{210}R^{211}$, wherein $R^{209}$, $R^{210}$, and $R^{211}$ are the same or different and are independently a hydrogen or a C1 to C10 aliphatic organic group, and n7 and n8 are the same or different and are independently an integer ranging from 0 to 2.

The group

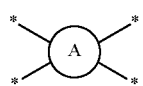

may be represented by Chemical Formula 15:

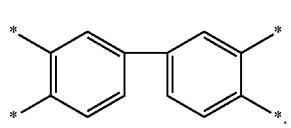

Chemical Formula 15

The group

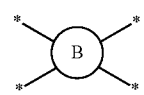

may be represented by Chemical Formula 16:

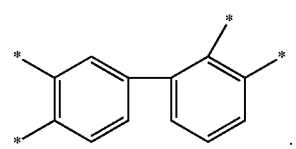

Chemical Formula 16

The group

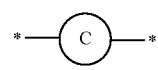

may be represented by Chemical Formula 17:

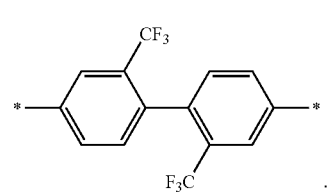

Chemical Formula 17

The polyimide represented by Chemical Formula 8 or a polyamic acid precursor of the polyimide may be prepared by reacting a tetracarboxylic dianhydride mixture including a tetracarboxylic dianhydride represented by Chemical Formula 1A, Chemical Formula 1B, or a combination thereof with a tetracarboxylic dianhydride represented by Chemical Formula 2, and a diamine represented by Chemical Formula 3 to carry out polymerization.

By polymerizing a tetracarboxylic dianhydride mixture of a tetracarboxylic dianhydride represented by Chemical Formula 1A, Chemical Formula 1B, or a combination thereof with a tetracarboxylic dianhydride represented by Chemical Formula 2 and a diamine represented by Chemical Formula 3, a polyamic acid precursor of the polyimide represented by Chemical Formula 8 may be prepared, which may undergo a thermal or chemical imidization to give a polyimide represented by Chemical Formula 8. Alternatively, before completely imidizing the polyamic acid precursor of the polyimide, the polyamic acid precursor solution may be partially imidized prior to casting on a substrate. This alternative procedure may result in a polyimide having further improved properties. Accordingly, if desired, after polymerizing the diamine and the tetracarboxylic dianhydride, the mixture may partially be imidized before casting on a substrate.

According to yet another embodiment, provided is an article prepared from the composition or the polyimide.

The article may be a film, a fiber, a coating material, or an adhesive.

The article may have a light transmittance of greater than about 87% at a wavelength range of from 380 nanometers (nm) to 780 nanometers as a film of about 10 micrometers (μm) thick. Thus, the article can be used in an application requiring a colorless, transparent film, such as, for example, an optical film or coating material.

Further, the article may have a light transmittance for light of greater than or equal to about 80%, for example, greater than or equal to about 84%, at 430 nanometers wavelength as a film of about 10 μm thick.

The article may have a yellowness index (YI) of less than about 4%, for example, less than about 3.5%.

The article may have an out-of-plane retardation of less than or equal to about 800 nanometers, for example, less than or equal to about 700 nanometers.

The article may have a high glass transition temperature, for example, of greater than or equal to about 310° C., for example, of greater than or equal to about 320° C., and may have a high 0.5% weight degradation temperature of greater than or equal to about 400° C., for example, of greater than or equal to about 410° C. Thus, the article prepared from the composition of the instant disclosure has good thermal properties.

The article prepared from the composition or from the polymer prepared from the composition according to an embodiment, such as, for example, a film, may have a high transmittance and a low yellowness index, and have a drastically reduced out-of-plane retardation ($R_{th}$). Accordingly, the film may be used as a retardation film in an optical device, such as, for example, a liquid crystal display device. Therefore, when the film is used as a transparent substrate for a display device, the film may also serve as a retardation film, so no additional retardation film would be necessary.

Accordingly, in an embodiment, the article may be an optical film.

The optical film may be prepared by reacting the composition according to an embodiment to prepare a polyimide or a polyamic acid precursor of the polyimide, casting the polyimide or the polyamic acid precursor of the polyimide on a substrate, and curing and extending the polyimide. The method of preparing the film is well known in the art, thus a detailed description is omitted.

According to still another embodiment, provided is a display device including the article.

The display device may be a liquid crystal display device ("LCD"), an organic light emitting diode ("OLED"), a complementary metal-oxide semiconductor ("CMOS"), and the like, but is not limited thereto.

In an embodiment, the display may be an LCD.

Among the display devices, a liquid crystal display (LCD) is described by referring to FIG. 1. FIG. 1 is a cross-sectional view of a liquid crystal display (LCD) in accordance with an embodiment.

Referring to FIG. 1, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 disposed between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 formed in the protective layer 180.

A pixel electrode 191 formed from a transparent conductive material such as ITO or IZO is disposed on the protective layer 180. The pixel electrode 191 is connected to the drain electrode 175 through the contact hole 185.

The common electrode panel 200 will now be described.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the polyimide or polyamic acid precursor of the polyimide according to the embodiment.

In a liquid crystal display device, a low out-of-plane retardation may be advantageous, considering the thickness of the liquid crystal. The optical film according to an embodiment may be used as a retardation film in a liquid crystal display device, or a transparent substrate for a liquid crystal display device, which is not limited thereto.

Hereafter, the technology of this disclosure is described in detail with reference to examples. The following examples and comparative examples are not restrictive but are illustrative.

EXAMPLES

Examples 1-1 to 12 and Comparative Examples 1 to 3

Preparation of a Polyimide Film

Example 1-1

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 10.98 g (0.037 mole) of BPDA, and 1.22 g (0.0042 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 1-2

The same process is performed as in Example 1-1, except that the acetic anhydride and pyridine are added in an amount of 80 mole % each, not 60 mole %, based on the total mole number of the amic acids in the prepared polyamic acid, such that 80% of the film is chemically imidized before being cured (thickness of 10 μm).

Example 2

124 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 11.7 g (0.036 mole) of 2,2'-bis(trifluoromethyl)benzidine (TFDB) is added and dissolved in the NMP, while maintaining the temperature at 25° C. To the solution, 8.08 g (0.0275 mole) of BPDA, and 2.69 g (0.0092 mole) of a-BPDA are added, and agitated for 48 hours to obtain a polyamic acid solution (solid content of 15 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 3

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 7.32 g (0.0249 mole) of BPDA, and 4.88 g (0.0166 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 4

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 6.71 g (0.0228 mole) of BPDA, and 5.49 g (0.0187 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 5

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 6.1 g (0.0208 mole) of BPDA, and 6.1 g (0.0208 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 6

121.1 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 5.98 g (0.0203 mole) of BPDA, and 6.22 g (0.0212 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 7

121.1 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution 5.86 g (0.0199 mole) of BPDA, and 6.34 g (0.0216 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Comparative Example 1

125.4 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 10.94 g (0.0342 mole) of 2,2'-bis(trifluoromethyl)benzidine (TFDB) is added and dissolved in the NMP, while maintaining the temperature at 25° C. To the solution, 10.05 g (0.0342 mole) of BPDA is added, and agitated for 48 hours to obtain a polyamic acid solution (solid content of 14 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 8

121.1 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 13.28 g (0.0415 mole) of 2,2'-bis(trifluoromethyl)benzidine (TFDB) is added and dissolved in the NMP, while maintain the temperature at 25° C. To the solution, 11.59 g (0.0394 mole) of BPDA, and 0.61 g (0.0021 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 9

121.1 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 13.28 g (0.0415 mole) of 2,2'-bis(trifluoromethyl)benzidine (TFDB) is added and dissolved in the NMP, while maintain the temperature at 25° C. To the solution, 11.47 g (0.039 mole) of BPDA, and 0.73 g (0.0025 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 10

121.1 mL of N-methyl-2-pyrrolidone (NMP) is fed in a 250 mL round-bottomed flask equipped with an agitator, an inlet for N₂ gas, and a cooler under N₂ atmosphere, and the temperature is set at 25° C. Then, 13.28 g (0.0415 mole) of 2,2'-bis(trifluoromethyl)benzidine (TFDB) is added and dissolved in the NMP, while maintaining the temperature at 25° C. To the solution, 11.1 g (0.0378 mole) of BPDA, and 1.0 g (0.0037 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 11

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.28 g (0.0415 mole) of 2,2'-bis(trifluoromethyl)benzidine (TFDB) is added and dissolved in the NMP, while maintaining the temperature at 25° C. To the solution, 5.73 g (0.0195 mole) of BPDA, and 6.47 g (0.022 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Example 12

121.1 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.28 g (0.0415 mole) of 2,2'-bis(trifluoromethyl)benzidine (TFDB) is added and dissolved in the NMP, while maintaining the temperature at 25° C. To the solution, 5.61 g (0.0191 mole) of BPDA, and 6.59 g (0.0224 mole) of a-BPDA are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Comparative Example 2

119.2 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 10.98 g (0.037 mole) of BPDA, and 0.92 g (0.00415 mole) of HPMDA (1,2,4,5-cyclohexane tetracarboxylic dianhydride) are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Comparative Example 3

122.8 mL of N-methyl-2-pyrrolidone (NMP) is fed in a 250 mL round-bottomed flask equipped with an agitator, an inlet for $N_2$ gas, and a cooler under $N_2$ atmosphere, and the temperature is set at 25° C. Then, 13.2 g (0.0415 mole) of 2,2'-bis(trifluoromethyl)benzidine (TFDB) is added and dissolved in the NMP, while maintaining the temperature at 25° C. To the solution, 10.87 g (0.037 mole) of BPDA, and 1.8 g (0.00415 mole) of 6FDA (hexafluoroisopropylidene)diphthalic anhydride) are added, and agitated for 48 hours to obtain a polyamic acid solution (solid content of 17 weight %). Then, 60 mol % of acetic anhydride and 60 mol % of pyridine based on the total mole number of the amic acids in the prepared polyamic acid are added to the solution, and agitated for 24 hours to chemically imidize the polyamic acid.

Upon completion of the reaction, the solution is coated on a glass substrate by spin-coating, which is heated on a hot plate at 80° C. for 1 hour, and is introduced into a furnace, where it is heated from room temperature to about 300° C. for 1.5 hours at a heating rate of about 3° C./min, maintained at 300° C. for 1 hour, and slowly cooled. Then, the polyimide is separated from the glass substrate (thickness of 10 μm).

Experiment Example 1

Evaluation of Optical Properties of Polyimide Film

Optical properties of the polyimide films according to Examples 1-1 to 12 and Comparative Examples 1-3 are measured and shown in Table 1 below.

In Table 1, the transmittance and YI are measured by using "KONICA MINOLTA CM3600d Spectrophotometer" produced by Konica Minolta, Inc., in a wavelength range of from 380 nanometers to 780 nanometers.

Further, the $R_{th}$ is measured by using "Axoscan".

TABLE 1

| | a-BPDA (mol %) | Trans. @ 380~780 nm (%) | Trans. @400 nm (%) | Trans. @430 nm (%) | YI | $R_{th}$@10 μm (nm) |
|---|---|---|---|---|---|---|
| Example 1-1 | 10 | 87.7 | 60 | 84.3 | 2.6 | 660 |
| Example 2 | 25 | 88.5 | 70.2 | 85.8 | 2.1 | 280 |
| Example 3 | 40 | 88.6 | 67.5 | 84.8 | 2.5 | 80 |
| Example 4 | 45 | 88.6 | 68.2 | 84.2 | 2.5 | 60 |
| Example 5 | 50 | 88.1 | 67.8 | 84.8 | 2.3 | 92 |
| Example 6 | 51 | 89.1 | 66.3 | 85 | 2.8 | 83 |
| Example 7 | 52 | 88.7 | 67.3 | 85.1 | 2.5 | 72 |
| Comparative Example 1 | 0 | 86.6 | 55.8 | 81.7 | 4 | 980 |
| Example 8 | 5 | 87 | 58.8 | 82.6 | 3.5 | 871 |
| Example 9 | 6 | 87 | 60.2 | 83.6 | 2.8 | 1121 |
| Example 10 | 9 | 87 | 61.3 | 83.1 | 3 | 1035 |
| Example 11 | 53 | brittle | — | — | — | — |
| Example 12 | 54 | brittle | — | — | — | — |
| Comparative Example 2 | HPMDA 10 mole % | 85.6 | 46.7 | 76.6 | 7.5 | 900 |
| Comparative Example 3 | 6FDA 10 mole % | 87.7 | 60.5 | 84.6 | 2.5 | 798 |

As shown from Table 1, the polyimide films prepared from the compositions including a tetracarboxylic dianhydride having a tilted dihedral structure according to Examples 1-1 to 7 exhibit transmittance for light greater than 87% at a wavelength range of 380 nm to 780 nm, greater than or equal to 60% at 400 nm, and greater than or equal to 84% at a wavelength of 430 nm. The transmittance values in these Examples are superior to those of the polyimides according to Comparative Example 1, which does not include a tetracarboxylic dianhydride having a tilted dihedral structure, Comparative Example 2, which includes 10 mole % of an aliphatic dianhydride, HPMDA (1,2,4,5-cyclohexane tetracarboxylic dianhydride), instead of a tetracarboxylic dianhydride having a tilted dihedral structure, and Comparative Example 3, which includes 10 mole % of a tetracarboxylic dianhydride having a planar structure, 6FDA, at all wavelength ranges.

Examples 8 to 10 include less than 10 mol % of a-BPDA, and the polyimide films prepared therefrom exhibit lower transmittances for light at 400 nm, as well as for light at a wavelength range of from 380 nm to 780 nm, compared to the polyimide films according to Examples 1-1 to 7.

Meanwhile, the polyimide films prepared from the compositions according to Examples 11 and 12, which include 53 mole % and 54 mole % of a-BPDA, respectively, are too fragile to measure transmittance.

Further, the polyimide films prepared from the compositions according to Examples 1-1 to 7 exhibit low YI of less than 3, compared to the polyimides prepared from Comparative Example 1 including BPDA only, or from Examples 8 to 10 including less than 10 mole % of a-BPDA. The polyimides prepared from the compositions according to Examples 11 and 12, which include 53 mole % and 54 mole % of a-BPDA, respectively, are too fragile to measure yellowness index (YI). The polyimide film prepared from Comparative Example 2 including 10 mole % of an aliphatic dianhydride, HPMDA, instead of a-BPDA, exhibits very high YI.

Meanwhile, the out-of-plane retardation ($R_{th}$) values of the films according to Examples 1-1 to 7 are very low (as low as of 660 nm), compared to the films prepared from the composition according to Comparative Example 2, which does not include a-BPDA, or from the compositions including less than 10 mole % of a-BPDA according to Examples 8 to 10. Specifically, the polyimide films prepared from the compositions according to Examples 2 to 7, which includes greater than or equal to 25 mole % of a-BPDA, exhibit extremely low $R_{th}$ of less than 300 nm.

Experiment Example 2

Thermal Properties of Polyimide Films

Thermal properties of the polyimide films prepared from the Examples and Comparative Examples are measured and shown in Table 2 below.

The glass transition temperature ($T_g$) is measured by using TA Instruments 2980 dynamic mechanical analyzer, employing the collection frequency of 1.0 Hertz (Hz), pre-load weight of 0.05 Newton (N), and heating rate of 5° C./minute. The $T_g$ value is determined as the tan δ response peak.

The coefficient of thermal expansion (CTE) is measured by using "TMA 2940 thermal mechanical analyzer" produced by TA Instruments. CTE is measured at the second scan of the temperature ranges from 50° C. to 250° C. and from 50° C. to 300° C. In the first scan, shrinkage of the film and water in the film are eliminated, and in the second scan is measured the CTE as the film's essential property. In this case, 0.05 N of fixed tension is employed, and heating rate is 10° C./min.

TABLE 2

| | a-BPDA (mol %) | CTE (ppm/° C.) @ 50~300° C. | Glass Transition Temperature (Tg)(° C.) | Temperature @0.5% Weight Loss (° C.) |
|---|---|---|---|---|
| Example 1-1 | 10 | 33 | 325 | 441 |
| Example 2 | 25 | 50 | 333 | 435 |
| Example 3 | 40 | 75 | 329 | 415 |
| Example 4 | 45 | 78 | 330 | 417 |
| Comparative Example 1 | 0 | 19 | 314 | 484 |
| Comparative Example 2 | 10 mole % of HPMDA | 43 | 319 | 389 |

As shown from Table 2, the polyimide films prepared from the compositions according to Examples 1-1 to 4 exhibit glass transition temperatures ($T_g$) of greater than or equal to 320° C., and 0.5 weight % degradation temperatures ($T_{d50}$) of greater than or equal to 410° C., which shows that the films have sufficient high temperature stability.

Meanwhile, there appears to be a tendency that the greater is the amount of a-BPDA, which has a tilted dihedral structure, the higher is the CTE. It is also believed that the polyimide has difficulty forming the CTC (Charge Transfer Complex) due to the titled dihedral structure. However, as shown from the experimental examples below, CTE may be controlled by the degree of chemical imidization prior to forming films.

Experiment Example 3

Control of CTE by Chemical Imidization

While 60% chemical imidization is performed prior to forming films in Examples 1-1 to 7, it has been found that 80% imidization prior to forming a film may reduce CTE by about 20%. A polyimide film is prepared in Example 1-2 in the same manner as in Example 1-1, except that the imidization degree is 80% in Example 1-2, while the imidization degree in Example 1-1 is 60%. The transmittance for light, yellowness index, $R_{th}$, and CTE of the films prepared in Examples 1-1 and 1-2 are measured and shown in Table 3 below.

TABLE 3

| | Trans. @ 380~780 nm (%) | Trans. @ 400 nm (%) | Trans. @ 430 nm (%) | YI | $R_{th}$ @ 10 μm (nm) | CTE (ppm/° C.) @ 50~300° C. |
|---|---|---|---|---|---|---|
| Example 1-1 | 87.7 | 60 | 84.3 | 2.6 | 660 | 33 |
| Example 1-2 | 87.5 | 64.4 | 84.3 | 2.6 | 662 | 25 |

As shown from Table 3, CTE may be substantially reduced by controlling the imidization ratio, without deteriorating the other optical or thermal properties.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. An film prepared from a composition, the composition comprising:
   a tetracarboxylic dianhydride represented by Chemical Formula 1A, Chemical Formula 1B, or a combination thereof,
   a tetracarboxylic dianhydride represented by Chemical Formula 2, and
   a diamine represented by the following chemical formula:

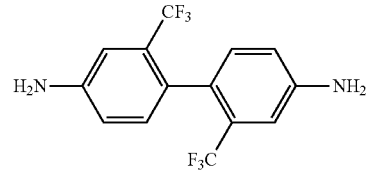 [SMILES: Nc1ccc(-c2ccc(N)cc2C(F)(F)F)c(C(F)(F)F)c1]

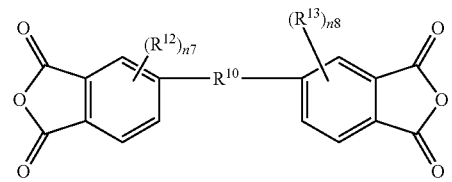

Chemical Formula 1A

Chemical Formula 1B

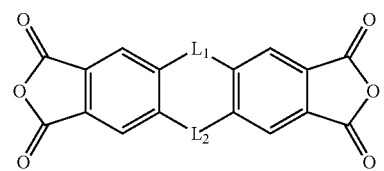

Chemical Formula 2

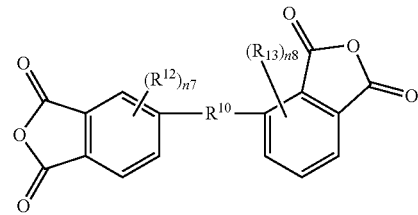

wherein in Chemical Formulae 1A, 1B, and 2, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{205}$, wherein R$^{205}$ is a C1 to C10 aliphatic organic group, or a silyl group of formula —SiR$^{209}$R$^{210}$R$^{211}$, wherein R$^{209}$, R$^{210}$, and R$^{211}$ are the same or different and are independently a hydrogen or a C1 to C10 aliphatic organic group, L$_1$ and L$_2$ are the same or different and are independently a single bond or a C1-C5 alkylene group, and n7 and n8 are the same or different and are independently an integer ranging from 0 to 3;

wherein the tetracarboxylic dianhydride represented by Chemical Formula 2 is included in an amount of greater than or equal to 40 mole % and less than or equal to 52 mole %, based on the total mole numbers of the tetracarboxylic dianhydride mixture wherein the thickness of the film is about 10 micrometers, and the out-of-plane retardation of the film is less than or equal to 92 nanometers.

2. The film according to claim 1, wherein R$^{10}$ is a substituted or unsubstituted C1 to C15 alkylene group, a substituted or unsubstituted C1 to C15 fluoroalkylene group, a substituted or unsubstituted C1 to C15 heteroalkylene group, a substituted or unsubstituted C3 to C15 cycloalkylene group, a substituted or unsubstituted C3 to C15 heterocycloalkylene group, a substituted or unsubstituted C6 to C15 arylene group, or a substituted or unsubstituted C2 to C15 heteroarylene group.

3. The film according to claim 1, wherein Chemical Formula 1A is represented by Chemical Formula 4 or Chemical Formula 5, and Chemical Formula 2 is represented by Chemical Formula 6 or Chemical Formula 7:

Chemical Formula 4

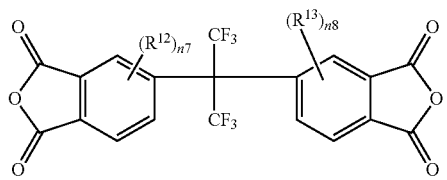

Chemical Formula 5

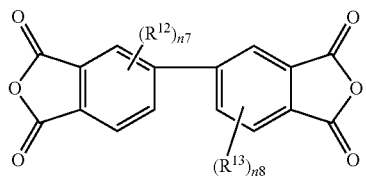

Chemical Formula 6

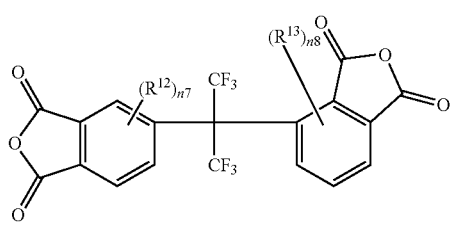

Chemical Formula 7

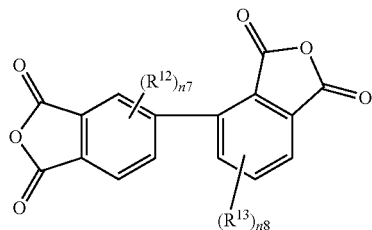

wherein in Chemical Formulae 4 to 7,

R$^{12}$ and R$^{13}$ are the same or different and are independently a halogen, a hydroxyl group, a substituted or unsubstituted C1 to C10 aliphatic organic group, a substituted or unsubstituted C6 to C20 aromatic organic group a group of formula —OR$^{200}$, wherein R$^{200}$ is a C1 to C10 aliphatic organic group, or a silyl group of formula —SiR$^{201}$R$^{202}$R$^{203}$, wherein R$^{201}$, R$^{202}$, and R$^{203}$ are the same or different and are independently a hydrogen or a C1 to C10 aliphatic organic group, and n7 and n8 are the same or different and are independently an integer ranging from 0 to 3.

4. The film according to claim 1, wherein Chemical Formula 1A is represented by Chemical Formula 18:

Chemical Formula 18

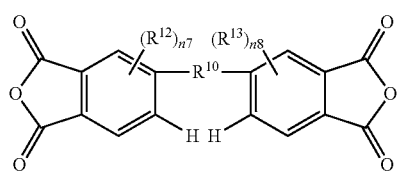

wherein in Chemical Formula 18,

R$^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, R$^{12}$ and R$^{13}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{205}$, wherein R$^{205}$ is a C1 to C10 aliphatic organic group, or a silyl group of formula —SiR$^{209}$R$^{210}$R$^{211}$ wherein R$^{209}$, R$^{210}$, and R$^{211}$ are the same or different and are independently a hydrogen or a C1 to C10 aliphatic organic group, and n7 and n8 are the same or different and are independently an integer ranging from 0 to 2.

5. The film according to claim 1, wherein the tetracarboxylic acid dianhydride represented by Chemical Formula 1A is one or more selected from 3,3',4,4'-biphenyltetracarboxylic dianhydride, 3,3',4,4'-diphenylsulfone tetracarboxylic dianhydride, 4,4'-(hexafluoroisopropylidene)diphthalic anhydride, and 4,4'-oxydiphthalic anhydride.

6. The film according to claim 1, wherein the tetracarboxylic acid dianhydride represented by Chemical Formula 2 is one or more selected from 2,3,3',4'-biphenyl tetracarboxylic dianhydride, 2,3,3',4'-diphenylsulfone tetracarboxylic dianhydride, and 3,4'-oxydiphthalic anhydride.

7. The film according to claim 1, wherein the tetracarboxylic dianhydride represented by Chemical Formula 1A is 3,3',4,4'-biphenyl tetracarboxylic dianhydride, and the tetracarboxylic dianhydride represented by Chemical Formula 2 is 2,3,3',4'-biphenyl tetracarboxylic dianhydride.

8. The film according to claim 1, wherein the thickness of the film is about 10 micrometers, and the yellowness index of the film is less than about 4%.

9. A display device comprising the film according to claim 1.

10. The display device according to claim 9, wherein the display device is a liquid crystal display device.

11. An film comprising a polyimide represented by Chemical Formula 8, or a polyamic acid precursor of the polyimide:

Chemical Formula 8

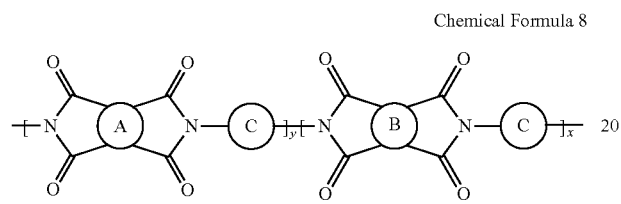

wherein in Chemical Formula 8,

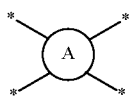

is represented by Chemical Formula 9A or Chemical Formula 9B,

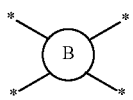

is represented by Chemical Formula 10:

Chemical Formula 9A

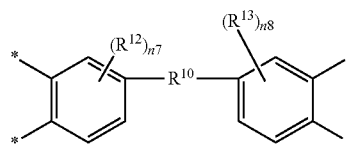

Chemical Formula 9B

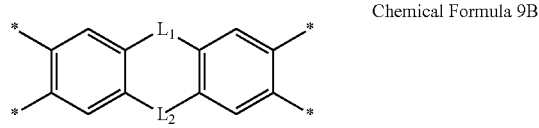

Chemical Formula 10

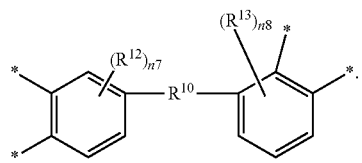

wherein in Chemical Formulae 9A, 9B, and 10,
$R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and are independently a halogen, a hydroxyl group, a substituted or unsubstituted C1 to C10 aliphatic organic group, a substituted or unsubstituted C6 to C20 aromatic organic group, a group of formula —$OR^{205}$, wherein $R^{205}$ is a C1 to C10 aliphatic organic group, or a silyl group of formula—$SiR^{209}R^{210}R^{211}$, wherein $R^{209}$, $R^{210}$, and $R^{211}$ are the same or different and are independently a hydrogen or a C1 to C10 aliphatic organic group, $L_1$ and $L_2$ are the same or different and are independently a single bond or a C1-C5 lkylene group, and n7 and n8 are the same or different and are independently an integer ranging from 0 to 3;

is represented by the following chemical formulae:

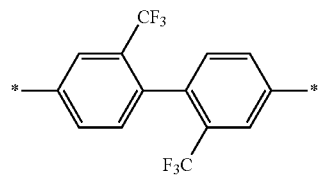

x and y are mole fractions of each structure unit provided that x is 0.40≤x≤0.52, and y is y=1−x wherein the thickness of the film is about 10 micrometers, and the out-of-plane retardation of the film is less than or equal to 92 nanometers.

12. The film according to claim 11, wherein Chemical Formula 9A is represented by Chemical Formula 11 or Chemical Formula 12, and Chemical Formula 10 is represented by Chemical Formula 13 or Chemical Formula 14:

Chemical Formula 11

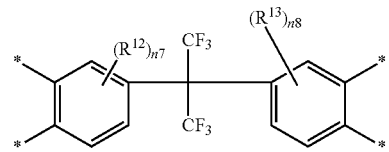

Chemical Formula 12

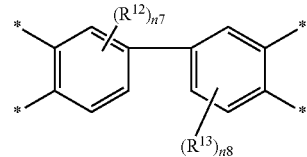

Chemical Formula 13

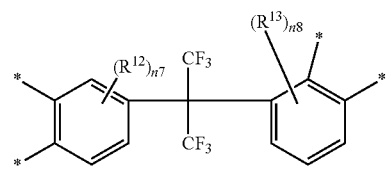

-continued

Chemical Formula 14

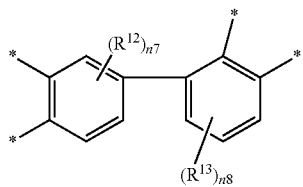

wherein in Chemical Formulae 11 to 14,
R$^{12}$ and R$^{13}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{205}$, wherein R$^{205}$ is a C1 to C10 aliphatic organic group, or a silyl group of formula —SiR$^{209}$R$^{210}$R$^{211}$, wherein R$^{209}$, R$^{210}$, and R$^{211}$ are the same or different and are independently a hydrogen or a C1 to C10 aliphatic organic group, and
n7 and n8 are the same or different and are independently an integer ranging from 0 to 3.

13. The film according to claim 11, wherein

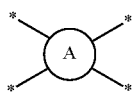

is represented by Chemical Formula 15:

Chemical Formula 15

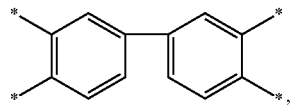

and

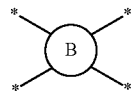

is represented by Chemical Formula 16:

Chemical Formula 16

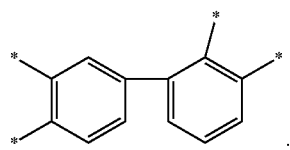

* * * * *